United States Patent [19]
Kishimoto

[11] Patent Number: 6,072,557
[45] Date of Patent: Jun. 6, 2000

[54] COLOR LIQUID CRYSTAL DISPLAY APPARATUS AND METHOD FOR PRODUCING THE SAME

[75] Inventor: Katsuhiko Kishimoto, Nara, Japan

[73] Assignee: Sharp Kabushiki Kaisha, Osaka, Japan

[21] Appl. No.: 09/362,993

[22] Filed: Jul. 30, 1999

[30] Foreign Application Priority Data

Jul. 31, 1998 [JP] Japan .................................. 10-218359

[51] Int. Cl.[7] .................................................. G02C 3/00
[52] U.S. Cl. ............................................ 349/156; 349/106
[58] Field of Search ................................... 349/156, 158, 349/106, 108, 183

[56] References Cited

U.S. PATENT DOCUMENTS

| | | | |
|---|---|---|---|
| 5,621,553 | 4/1997 | Nishiguchi et al. | 349/153 |
| 5,627,665 | 5/1997 | Yamada et al. | 349/156 |
| 5,726,728 | 3/1998 | Kondo et al. | 349/156 |
| 5,771,084 | 6/1998 | Fujimori et al. | 349/153 |
| 5,844,643 | 12/1998 | Onishi et al. | 349/93 |

FOREIGN PATENT DOCUMENTS 7-120728  5/1995  Japan .

*Primary Examiner*—Kenneth Parker
*Assistant Examiner*—Mike Qi
*Attorney, Agent, or Firm*—Nixon & Vanderhye, P.C.

[57] ABSTRACT

A color liquid crystal display apparatus of the present invention, includes: a first substrate; a second substrate; and a liquid crystal layer interposed between the first and second substrates, wherein the first substrate includes a color filter having a plurality of coloring resin layers, polymer wall covering a boundary portion between two adjacent coloring resin layers among the plurality of coloring resin layers, and transparent electrodes covering at least a part of the polymer wall, the liquid crystal layer has a plurality of liquid crystal regions partitioned by the polymer wall; and liquid crystal molecules in the plurality of liquid crystal regions are axially symmetrically aligned with respect to an axis perpendicular to a surface of the first substrate at least under an application of a voltage.

15 Claims, 14 Drawing Sheets

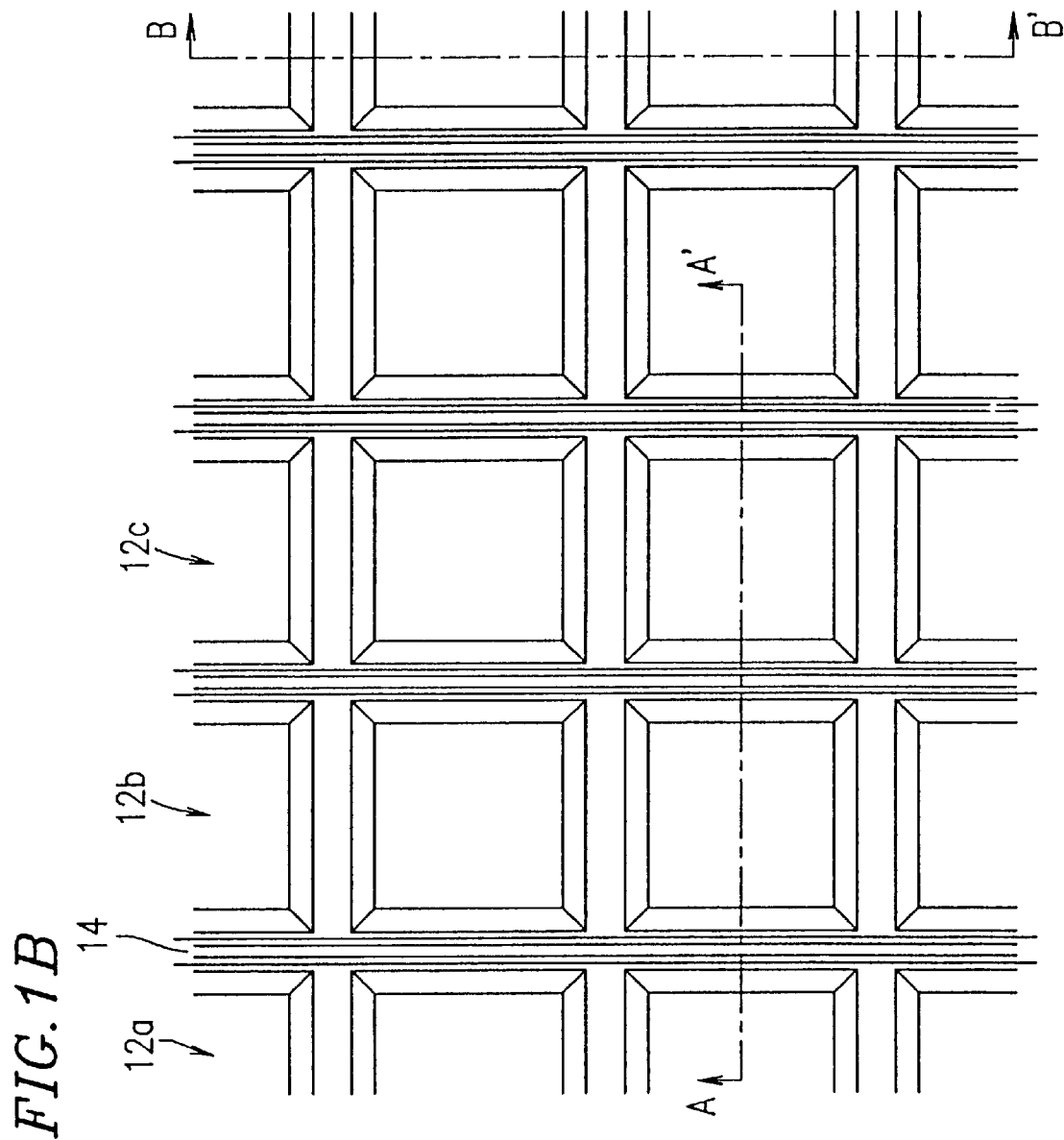

Observed in black

Extinction pattern

*FIG.3B*
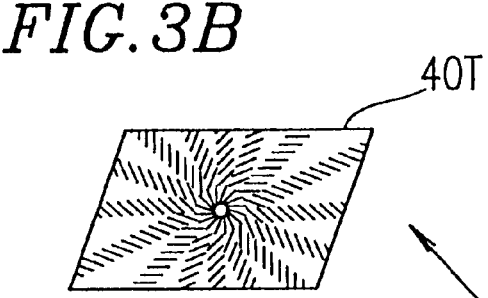
40T
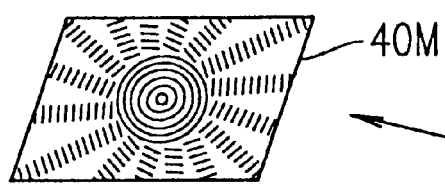
40M
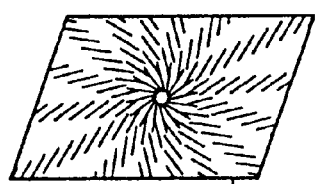
40B
*FIG.3A*
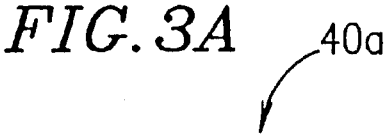
40a
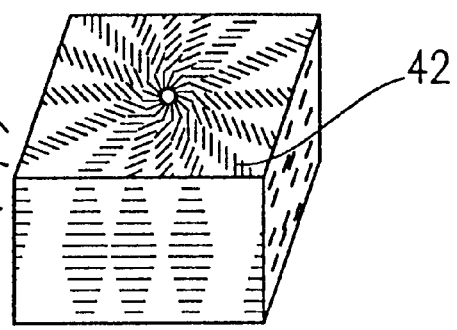
42

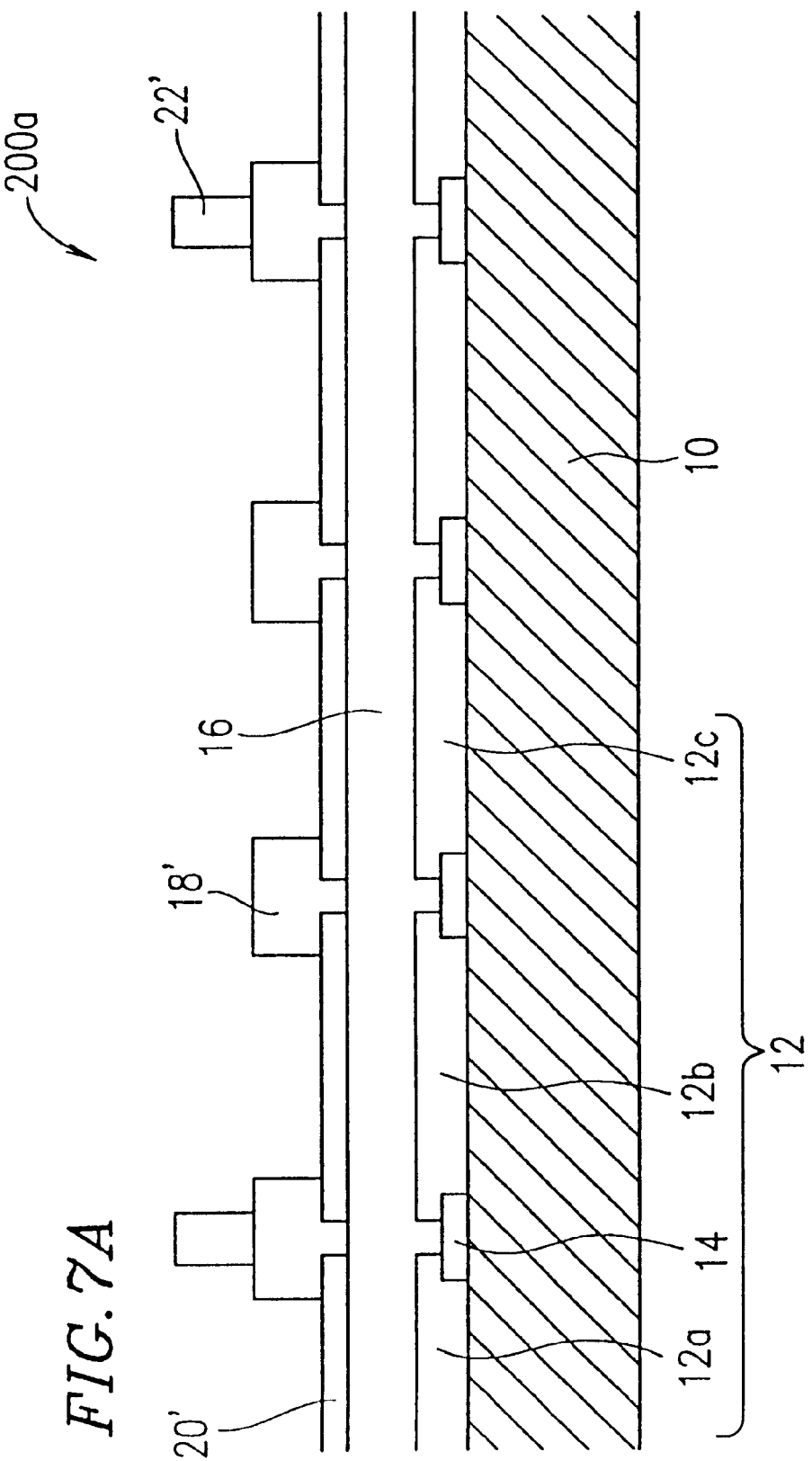

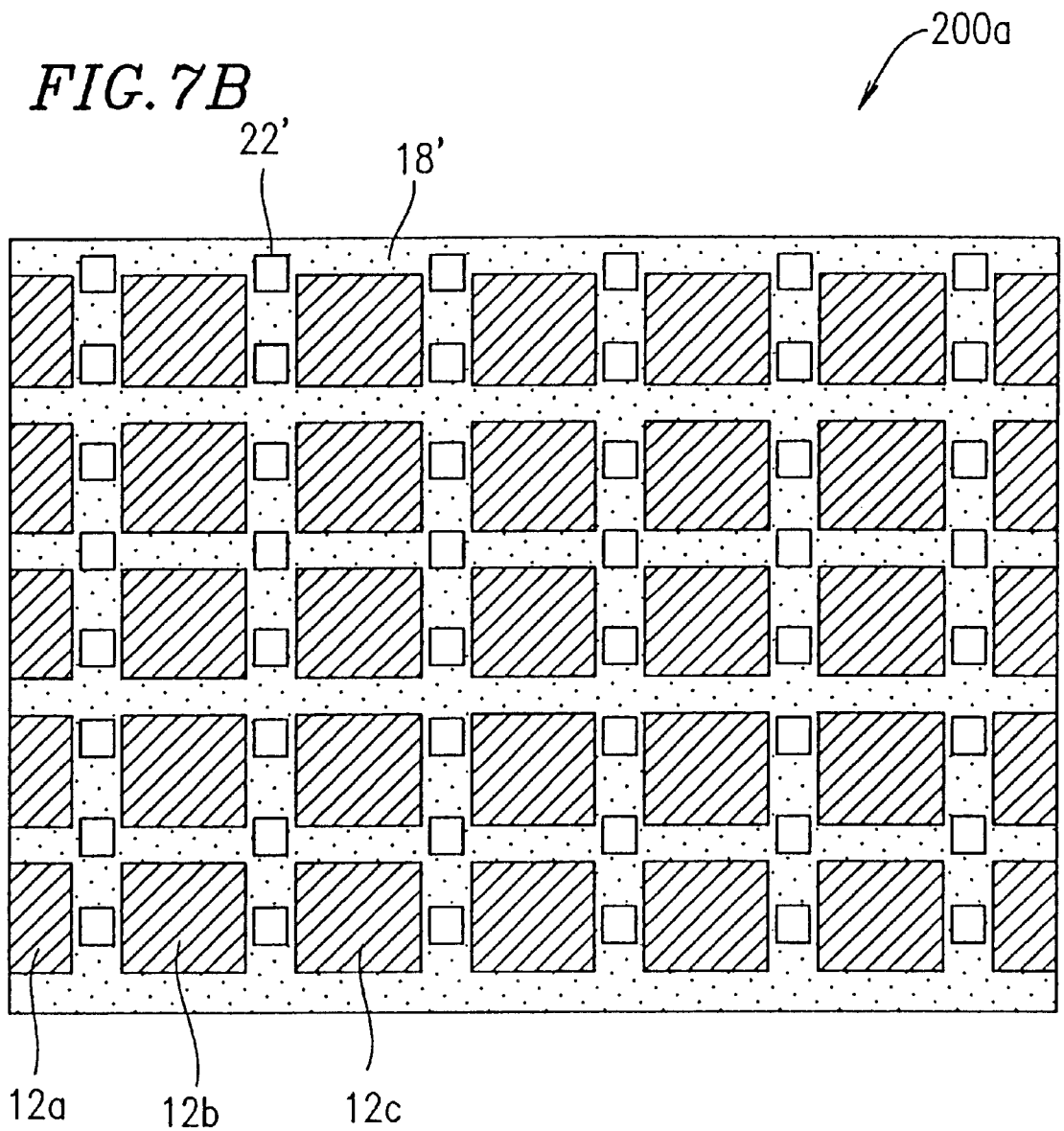

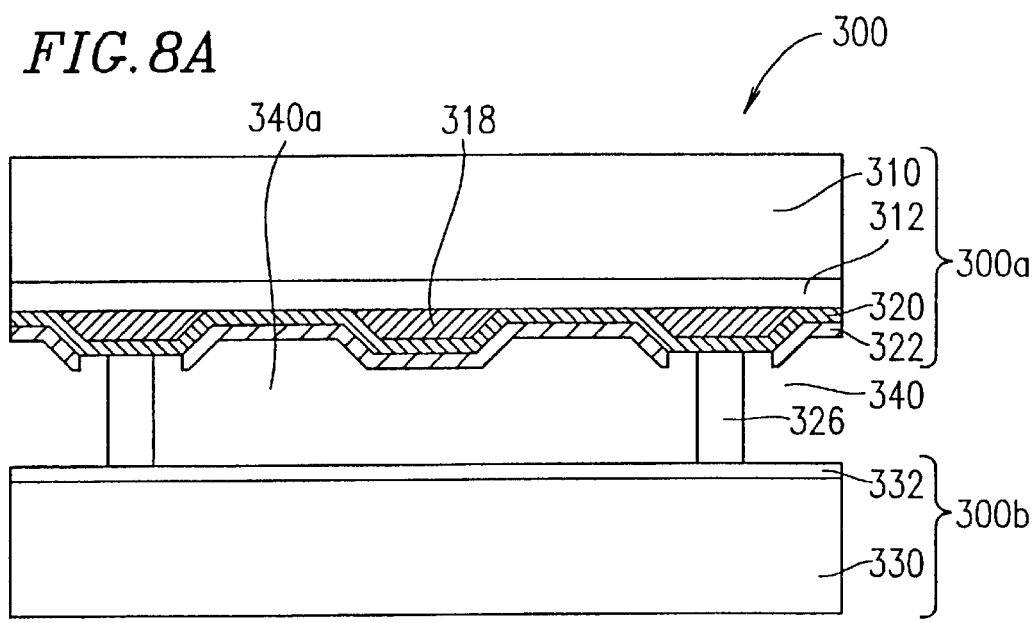
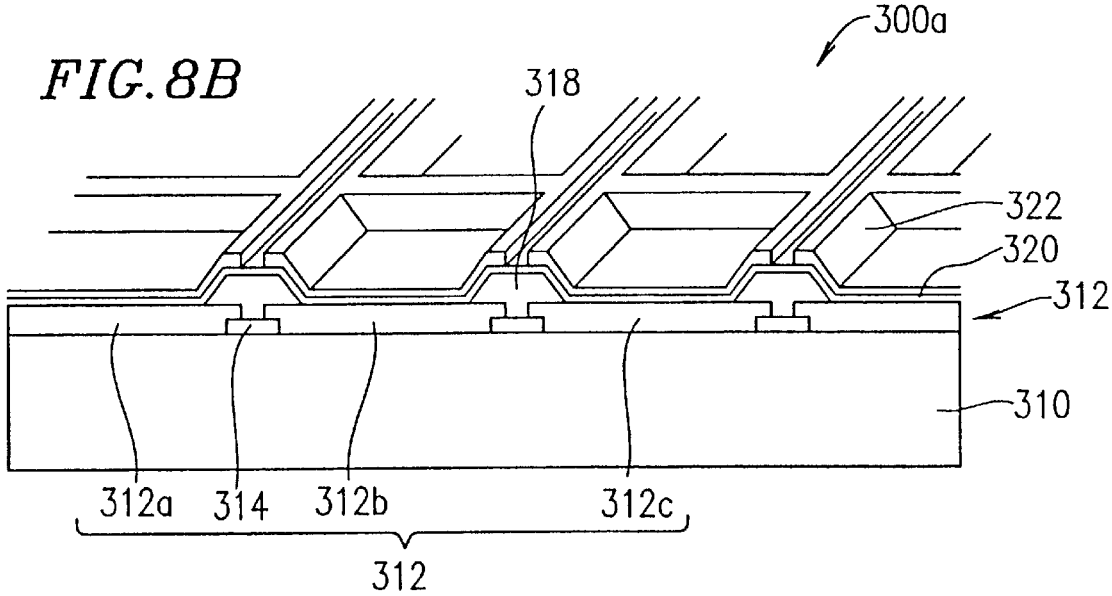

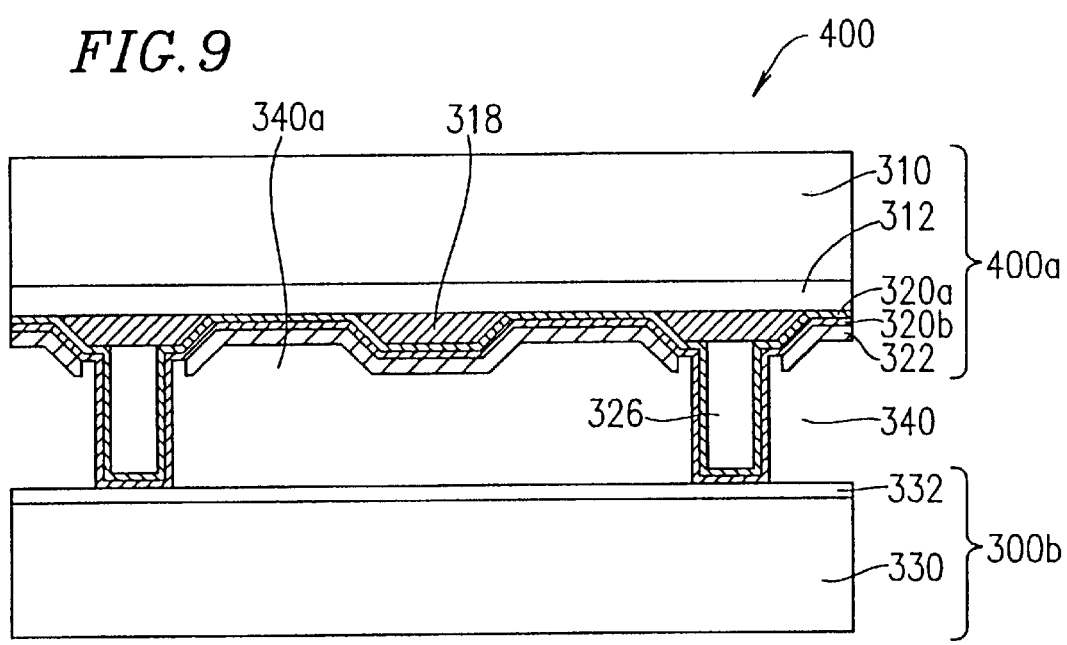

*FIG. 10A* (Prior Art)
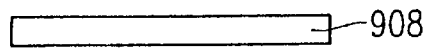
*FIG. 10B* (Prior Art)
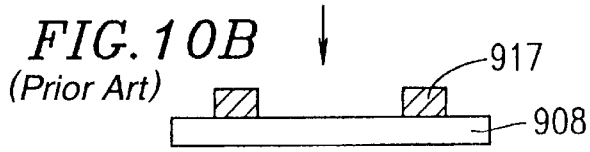
*FIG. 10C* (Prior Art)
*FIG. 10E* (Prior Art)
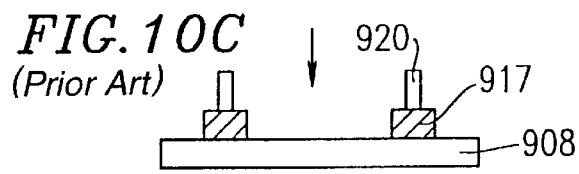
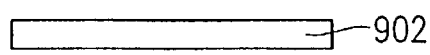
*FIG. 10D* (Prior Art)
*FIG. 10F* (Prior Art)
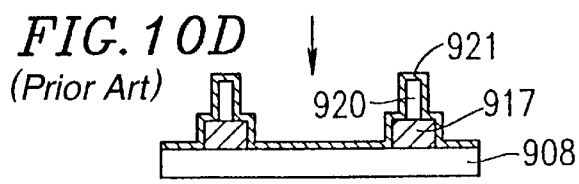
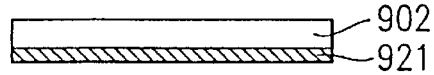
*FIG. 10G* (Prior Art)
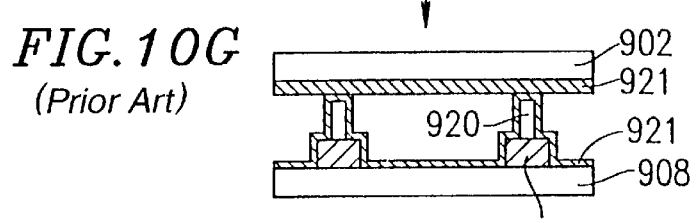
*FIG. 10H* (Prior Art)
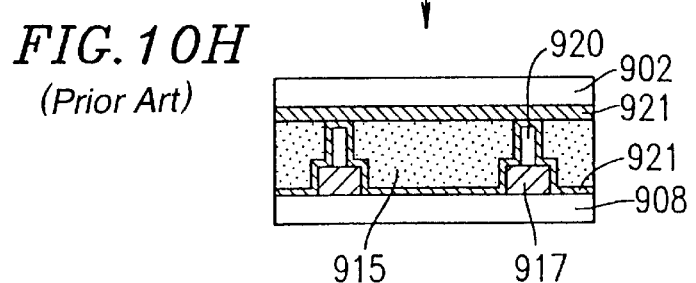
*FIG. 10I* (Prior Art)
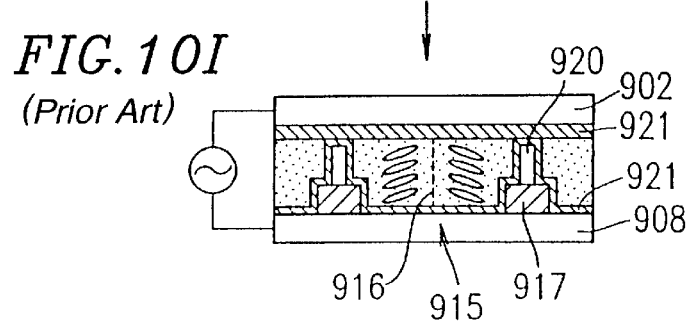

COLOR LIQUID CRYSTAL DISPLAY APPARATUS AND METHOD FOR PRODUCING THE SAME

BACKGROUND OF THE INVENTION

1. Field of the Invention

The present invention relates to a color liquid crystal display apparatus and a method for producing the same. In particular, the present invention relates to a color liquid crystal display apparatus including liquid crystal molecules which are axially symmetrically aligned in liquid crystal regions partitioned by a polymer wall, and a method for producing the same.

2. Description of the Related Art

In the past, as a display apparatus utilizing an electrooptical effect, a twisted nematic (TN) liquid crystal display apparatus and super-twisted nematic (STN) liquid crystal display apparatus using nematic liquid crystal have been used. A technique of widening the viewing angle of these liquid crystal display apparatuses have been vigorously developed.

As one technique of widening the viewing angle of a TN liquid crystal display apparatus, Japanese Laid-Open Publication Nos. 6-301015 and 7-120728 disclose a liquid crystal display apparatus including liquid crystal molecules which are axially symmetrically aligned in liquid crystal regions partitioned by a polymer wall (i.e., an axially symmetrically aligned microcell (ASM) mode liquid crystal display apparatus). A liquid crystal region substantially surrounded by a polymer wall is typically formed on a pixel basis. In the ASM mode liquid crystal display apparatus, liquid crystal molecules are axially symmetrically aligned, so that the contrast is not changed even when an observer sees the apparatus in any direction. That is, the ASM mode liquid crystal display apparatus has wide viewing angle characteristics.

The ASM mode liquid crystal display apparatuses disclosed in the above-mentioned publications are produced by phase-separating a mixture of a polymerizable material and a liquid crystal material while inducing polymerization.

Referring to FIGS. 10A through 10I, a method for producing a conventional ASM mode liquid crystal display apparatus will be described. First, a glass substrate 908 on one side of which a color filter and electrodes are formed (FIG. 10A). For simplicity, the electrodes and the color filter formed on the glass substrate 908 are not shown. A method for forming the color filter will be described later.

Next, a polymer wall 917 for axially symmetrically aligning liquid crystal molecules is formed, for example, in a lattice shape on the surface of the glass substrate 908 on which the electrodes and the color filter are formed (FIG. 10B) in the following manner. A photosensitive resin material is spin-coated on the surface of the glass substrate 908, and the resultant substrate 908 is exposed to light through a photomask, followed by development, whereby a lattice-shaped polymer wall is formed. The photosensitive resin material may be negative or positive. Although the step of separately forming a resist film is added, the resist film can be formed by using a resin material having no photosensitivity.

A column-shaped projection 920 is patterned on a part of the top of the polymer wall 917 (FIG. 10C). The column-shaped projections 920 are also formed by exposing a photosensitive color resin material to light, followed by development.

The surface of the glass substrate 908 on which the polymer wall 917 and the column-shaped projections 920 are formed is covered with a vertical alignment agent 921 such as polyimide (FIG. 10D). On the other hand, a counter glass substrate 902 on which electrodes are formed is also covered with the vertical alignment agent 921 (FIGS. 10E and 10F).

Two substrates thus obtained are attached to each other so that the surfaces having electrodes face each other, whereby a liquid crystal cell is formed (FIG. 10G). A distance (cell gap: thickness of a liquid crystal layer) between two substrates is defined by the sum of the heights of the polymer wall 917 and the column-shaped projection 920.

A liquid crystal material is injected into the gap of the liquid crystal cell by a vacuum injection method or the like (FIG. 10H). Finally, for example, by applying a voltage across the electrodes on both substrates, liquid crystal molecules are axially symmetrically aligned in a liquid crystal region 915 (FIG. 10I). The liquid crystal molecules in the liquid crystal region 915 partitioned by the polymer wall 917 are axially symmetrically aligned with respect to an axis 916 (vertical to both substrates) represented by a broken line in FIG. 10I.

FIG. 11 shows a cross-sectional structure of a conventional color filter. A black matrix (BM) for blocking light in a gap of a coloring pattern and coloring resin layers of red (R), green (G), and blue (B) corresponding to each pixel are formed on a glass substrate. An overcoat (OC) layer (thickness: about 0.5 to about 2.0 $\mu$m) made of acrylic resin, epoxy resin, or the like is formed for the purpose of improving flatness. An indium tin oxide (ITO) film of a transparent signal electrode is formed on the OC layer. The BM is generally made of a chromium film (thickness: about 100 to about 150 nm). The coloring resin layer is made of a resin material colored with a dye, a pigment, or the like, and the thickness thereof is generally about 1 to about 3 $\mu$m.

The color filter is formed by patterning the photosensitive coloring resin layers formed on the substrate by photolithography. For example, photosensitive coloring resin materials of R, G, and B are formed, exposed to light, and developed (three times in total), whereby a color filter of R, G, and B can be formed. As a method for forming the photosensitive coloring resin layer, there are a method for coating a liquid photosensitive coloring resin material (diluted in a solvent) on a substrate by spin-coating and a method for transcribing a dry-filmed photosensitive coloring resin material onto a substrate. The above-mentioned ASM mode liquid crystal display apparatus is produced by using the color filter thus formed, whereby a color liquid crystal display apparatus having wide viewing angle characteristics can be obtained.

However, in the case where the above-mentioned ASM mode liquid crystal display apparatus and the method for producing the same are applied to a color liquid crystal display apparatus, the following problems arise.

As described above, in the past, a coloring resin layer of each color for a color filter is formed, an OC layer is formed thereon, and thereafter, an ITO film is formed and patterned. The OC layer is provided for the purpose of flattening nonuniform portions of the surface of the color filter (boundary portions where coloring resin layers of R, G, and B are adjacent to each other, i.e., an overlapped portion of each coloring resin layer and a black matrix), preventing disconnection of the ITO film in the course of production, and preventing each coloring resin layer of R, G, and B from being corroded by an etchant (e.g., aqua regia, ferric chloride) of ITO in the step of etching the ITO film for patterning.

However, the OC layer itself slightly absorb light, which decreases transmittance, resulting in decreased brightness. Furthermore, when a polymer wall is formed on electrodes, the voltage substantially applied to a liquid crystal layer is decreased due to the capacity of the polymer wall. Furthermore, the retention ratio of the voltage (hereinafter, referred to as a voltage retention ratio) applied to the liquid crystal layer is decreased. Furthermore, it was found that the decrease in the voltage retention ratio likely causes image sticking during display, which is a problem in terms of reliability.

SUMMARY OF THE INVENTION

A color liquid crystal display apparatus of the present invention, includes: a first substrate; a second substrate; and a liquid crystal layer interposed between the first and second substrates, wherein the first substrate includes a color filter having a plurality of coloring resin layers, a polymer wall covering a boundary portion between respective two adjacent coloring resin layers among the plurality of coloring resin layers, and transparent electrodes covering at least a part of the polymer wall, the liquid crystal layer has a plurality of liquid crystal regions partitioned by the polymer wall; and liquid crystal molecules in the plurality of liquid crystal regions are axially symmetrically aligned with respect to an axis perpendicular to a surface of the first substrate at least under an application of a voltage.

In one embodiment of the present invention, the polymer wall has side faces inclined with respect to the surface of the first substrate.

In another embodiment of the present invention, an angle of the side faces of the polymer wall inclined with respect to the surface of the first substrate is in a range of 3° to 45°.

In another embodiment of the present invention, the polymer wall is made of photosensitive resin.

In another embodiment of the present invention, the polymer wall is made of transparent resin.

In another embodiment of the present invention, the above-mentioned color liquid crystal display apparatus further includes column-shaped projections on at least a part of a surface of the polymer wall on the liquid crystal layer side, wherein a gap between the first and second substrates is formed by the polymer wall and the column-shaped projections.

In another embodiment of the present invention, the first substrate has a silicon dioxide layer covering the polymer wall, and the transparent electrodes are formed on the silicon dioxide layer.

In another embodiment of the present invention, the above-mentioned color liquid crystal display apparatus further includes column-shaped projections on at least a part of a surface of the polymer wall on the liquid crystal layer side, wherein a gap between the first and second substrates is formed by the polymer wall and the column-shaped projections, and the column-shaped projections are formed on the silicon dioxide layer.

In another embodiment of the present invention, the above-mentioned color liquid crystal display apparatus further includes column-shaped projections on at least a part of a surface of the polymer wall on the liquid crystal layer side, wherein a gap between the first and second substrates is formed by the polymer wall and the column-shaped projections, and a silicon dioxide layer is formed on the polymer wall and a surface of the column-shaped projections on the liquid crystal layer side.

In another embodiment of the present invention, the above-mentioned color liquid crystal display apparatus further includes a silicon nitride layer between the surfaces of the polymer wall and the column-shaped projections on the liquid crystal layer side, and the silicon dioxide layer.

According to another aspect of the present invention, a method for producing a liquid crystal display apparatus including a first substrate, a second substrate, and a liquid crystal layer interposed between the first and second substrates, the liquid crystal layer including a plurality of liquid crystal regions partitioned by a polymer wall, includes the steps of: forming a color filter layer having a plurality of coloring resin layers on the first substrate; forming a polymer layer made of photosensitive resin on the color filter layer; patterning the polymer layer by photolithography, thereby forming the polymer wall covering boundary portions between respective two adjacent coloring resin layers among the plurality of coloring resin layers; forming a transparent conductive layer on the first substrate on which the polymer wall is formed; and patterning the transparent conductive layer to form transparent electrodes covering at least a part of the polymer wall.

In one embodiment of the present invention, the above-mentioned method for producing a color liquid crystal display apparatus further includes the step of forming a silicon dioxide layer on the polymer wall, wherein the transparent conductive layer is formed on the first substrate on which the silicon dioxide layer is formed, and the transparent conductive layer formed on the silicon dioxide layer is selectively etched to form the transparent electrodes.

In another embodiment of the present invention, the above-mentioned method for producing a color liquid crystal display apparatus further includes the step of forming column-shaped projections on at least a part of a surface of the polymer wall on the liquid crystal layer side, wherein the column-shaped projections are formed on the silicon dioxide layer which is exposed by selective etching the transparent conductive layer.

In another embodiment of the present invention, the method for producing a color liquid crystal display apparatus further includes the steps of forming column-shaped projections on at least a part of a surface of the polymer wall on the liquid crystal layer side, and forming a silicon dioxide layer on the surfaces of the polymer wall and the column-shaped projections on the liquid crystal layer side.

In another embodiment of the present invention, the above-mentioned method for producing a color liquid crystal display apparatus further includes the step of forming a silicon nitride layer between the surfaces of the polymer wall and the column-shaped projections on the liquid crystal layer side, and the silicon dioxide layer.

Hereinafter, the function of the present invention will be described.

According to the present invention, a structure in which an OC layer is not present in an opening portion (central portion) of each pixel is realized. Therefore, compared with a conventional structure, a color liquid crystal display apparatus with improved transmittance and brightness is obtained, compared with a conventional structure. The polymer wall in the color liquid crystal display apparatus of the present invention partitions the liquid crystal layer into a plurality of liquid crystal regions, and axially symmetrically align liquid crystal molecules in the liquid crystal regions. Furthermore, the polymer wall covers nonuniform portions of the color filter layer on the black matrix, and protect boundary portions between the coloring resin layers. Thus, the OC layer can be omitted, which is conventionally provided for the purpose of flattening nonuniform portions on the surface of the color filter layer and protecting the color filter layer and the black matrix. Furthermore, the pixel electrodes are formed on the polymer wall, and the polymer wall is not present between the pixel electrodes and the counter electrode, so that the voltage retention ratio can be prevented from decreasing.

Furthermore, the polymer wall has side faces inclined (preferably at about 3° to about 45°) with respect to the substrate surface. Therefore, the polymer wall axially symmetrically aligns liquid crystal molecules in a stable manner, and disconnection of the conductive film formed on the polymer wall can be prevented.

By forming the polymer wall of photosensitive resin, a color liquid crystal display apparatus with high productivity can be provided. Furthermore, by forming the polymer wall of transparent resin, the light-using efficiency can be further improved.

By forming the silicon dioxide layer covering the polymer wall and forming the transparent electrodes on the silicon dioxide layer, the surface of the polymer wall does not come into contact with a liquid crystal material. Therefore, impurities in the polymer wall can be prevented from being eluted to the liquid crystal layer. In a structure in which the column-shaped projections are further formed on at least a part of the surface of the polymer wall on the liquid crystal layer side, by forming the column-shaped projections on the silicon dioxide layer, the adhesion between the column-shaped projections and the polymer wall can be improved.

Furthermore, by forming the silicon dioxide layer on the polymer wall and the column-shaped projections on the liquid crystal layer side, impurities are prevented from being eluted from the polymer wall and the column-shaped projections to the liquid crystal layer. By further forming the silicon nitride layer between the surface of the column-shaped projections on the liquid crystal layer side and the silicon dioxide layer, an effect of preventing impurities from being eluted can be further enhanced.

According to the method for producing a color liquid crystal display apparatus of the present invention, the polymer wall covering boundary portions between respective two adjacent coloring resin layers are formed by photolithography, using a photosensitive resin. Therefore, the OC layer as well as the polymer wall can be simultaneously formed, so that the number of steps and a production cost are decreased, and the production yield is improved, compared with a conventional method for producing a liquid crystal display apparatus using an ASM mode.

Since the method of the present invention further includes the step of forming the silicon dioxide layer on the polymer wall, the polymer wall will not be exposed to the liquid crystal layer even in a region where a transparent conductive layer is removed by etching in the step of patterning the transparent conductive layer.

By forming the column-shaped projections on the silicon dioxide layer which is exposed by selective etching of the transparent conductive layer, adhesion is improved, and the column-shaped projections are prevented from peeling off.

Furthermore, by forming the silicon dioxide layer on the polymer wall and the surface of the column-shaped projections on the liquid crystal layer side, impurities are prevented from being eluted from the polymer wall and the column-shaped projections to the liquid crystal layer. By forming the silicon nitride layer between the surface of the column-shaped projections on the liquid crystal layer side and the silicon dioxide layer, an effect of covering a surface can be enhanced. The silicon dioxide layer, the silicon nitride layer, and the transparent conductive layer (ITO layer) can be continuously formed in the same apparatus by changing only the atmosphere gas and the target. Therefore, each area between the layers can be prevented from being contaminated by impurities.

Thus, the invention described herein makes possible the advantages of (1) providing a color liquid crystal display apparatus with outstanding reliability and improved transmittance; and (2) providing a highly efficient method for producing the color liquid crystal display apparatus.

These and other advantages of the present invention will become apparent to those skilled in the art upon reading and understanding the following detailed description with reference to the accompanying figures.

BRIEF DESCRIPTION OF THE DRAWINGS

FIG. 1B is a schematic top view of the liquid crystal display apparatus in Embodiment 1.

FIG. 3A and 3B are schematic views illustrating an axially symmetrically alignment state of liquid crystal molecules in a liquid crystal region.

FIG. 7A is a cross-sectional view of a color filter substrate used in a liquid crystal display apparatus in Comparative Example 1.

FIG. 7B is a top view of the color filter substrate used in the liquid crystal display apparatus in Comparative Example 1.

FIG. 8A is a schematic cross-sectional view of a liquid crystal display apparatus in Embodiment 2. FIG. 8B is a perspective view thereof.

FIG. 9 is a schematic cross-sectional view of a liquid crystal display apparatus in Embodiment 3.

FIGS. 10A to 10I illustrate a method for producing a conventional ASM mode liquid crystal display apparatus.

DESCRIPTION OF THE PREFERRED EMBODIMENTS

Embodiment 1

Figure 1A:
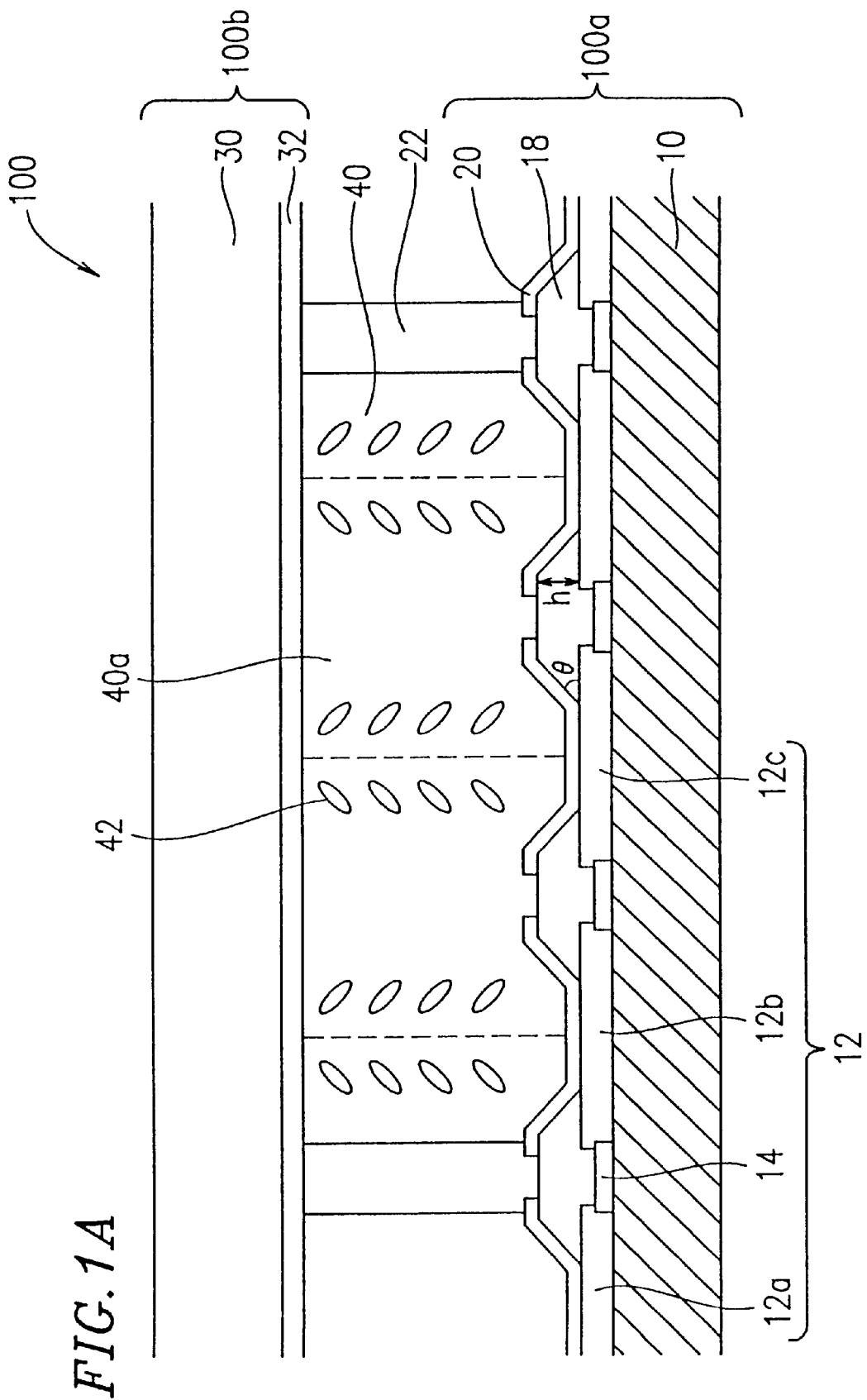
FIG. 1A is a schematic cross-sectional view of a liquid crystal display apparatus in Embodiment 1.
Figure 1C:
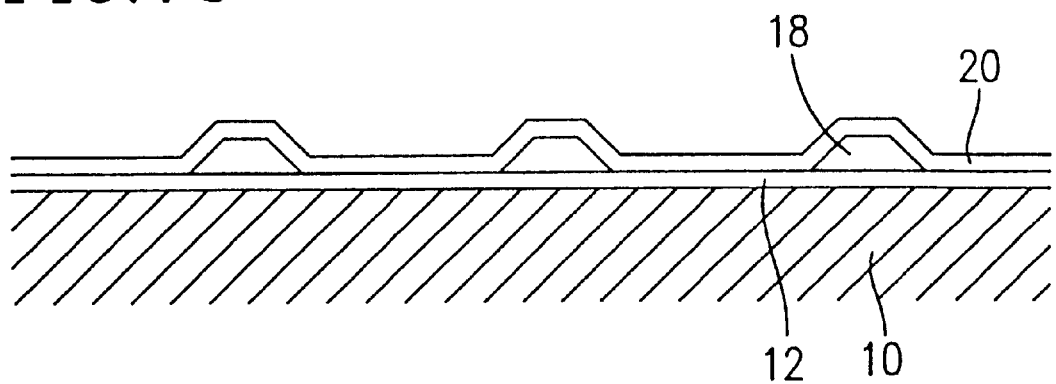
FIG. 1C is a schematic cross-sectional view of the liquid crystal display apparatus in Embodiment 1 in another direction.

FIGS. 1A, 1B, and 1C show a liquid crystal display apparatus in Embodiment 1. FIG. 1A schematically shows a cross-section of the liquid crystal display apparatus 100. FIG. 1B is a top view thereof. FIG. 1A is taken along a line A–A' in FIG. 1B, and FIG. 1C is taken along the line B–B' in FIG. 1B. In Embodiment 1, the case of using a liquid crystal material having negative dielectric anisotropy and a vertical alignment film is illustrated; however, Embodiment 1 is not limited thereto.

The liquid crystal display apparatus 100 includes a color filter substrate 100a, a counter substrate 100b, and a liquid crystal layer 40 interposed therebetween. The color filter substrate 100a is constructed as follows. A black matrix 14 and a color filter layer 12 having coloring resin layers 12a, 12b, and 12c corresponding to R, G, and B are formed on a transparent substrate 10 such as a glass substrate.

A polymer wall 18 is formed so as to cover boundary portions between adjacent coloring resin layers (i.e., boundary portions between the coloring resin layers 12a and 12b and between the coloring resin layers 12b and 12c). The polymer wall 18 partitions the liquid crystal layer 40 into a plurality of liquid crystal regions 40a, and axially symmetrically align liquid crystal molecules 42 in the liquid crystal regions 40a. Furthermore, the polymer wall 18 covers nonuniform portions on the surface of the color filter layer 12 on the black matrix 14, and functions as a protective film for protecting the boundary portions between the coloring resin layers 12a and 12b and between the coloring resin layers 12b and 12c during the subsequent step. As shown in FIGS. 1A to 1C, it is preferable that the polymer wall 18 is not formed at central portions of the coloring resin layers 12a, 12b, and 12C (i.e., central portions of pixel regions). If the polymer wall 18 is present at central portions of the pixel regions, the polymer wall 18 absorbs light, which decreases transmittance.

The polymer wall 18 has side faces inclined with respect to the substrate surface. The polymer wall 18 partitions the liquid crystal layer 40 into the liquid crystal regions 40a and axially symmetrically align the polymer molecules 42. The liquid crystal regions 40a are typically formed so as to correspond to pixel regions. In the liquid crystal display apparatus of the present invention, pixel electrodes 20 made of ITO are formed on the polymer wall 18. In FIGS. 1A to 1C, each pixel electrode 20 is formed so as to correspond to one pixel region. The pixel electrodes 20 are addressed by active elements (now shown) such as thin film transistors (TFTs). A gap between the adjacent pixel electrodes is formed on the polymer wall 18.

On top of the polymer wall 18 on which the pixel electrodes 20 are formed, a column-shaped projection 22 for creating a space in which the liquid crystal layer 40 is formed. The column-shaped projections 22 should be formed at an appropriate density so that sufficient strength can be obtained. A vertical alignment film (not shown) is formed on the surface of the substrate 100a having the above-mentioned components (at least the surface of the electrodes 20).

A counter substrate 100b has a structure in which a counter electrode 32 made of ITO is formed on a transparent substrate 30 such as a glass substrate. Furthermore, a vertical alignment film (not shown) is formed so as to cover the counter electrode 32. The structures of the pixel electrodes 20 and the counter electrode 32 for driving the liquid crystal layer are not limited to those as described above. A known electrode structure and driving method can be used. A simple matrix type as well as an active matrix type are applicable to the present embodiment.

Figure 2A:
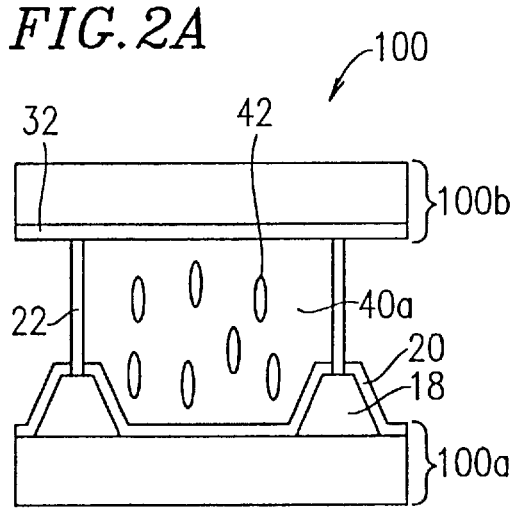
FIGS. 2A and 2B are schematic views illustrating as operation of an ASM mode liquid crystal display apparatus when no voltage is applied.
Figure 2C:
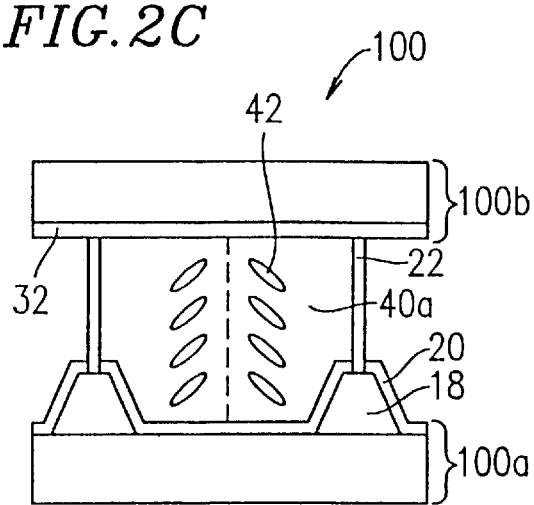
FIGS. 2C and 2D are schematic views illustrating an operation of an ASM mode liquid crystal apparatus under the application of a voltage.
Figure 2B:
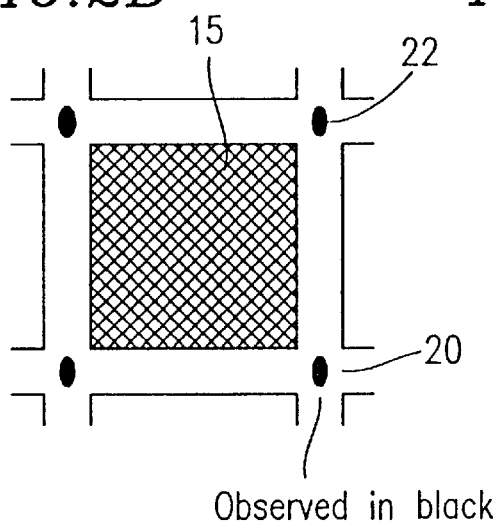
Figure 2D:
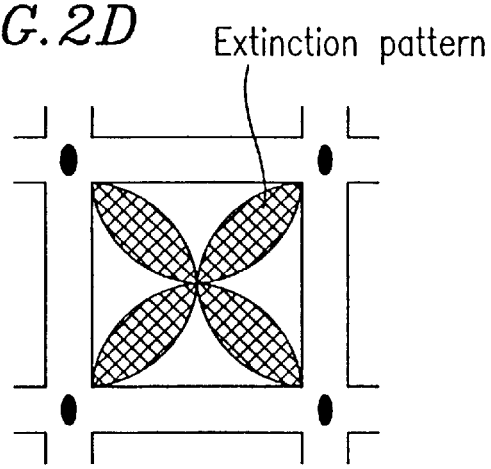

The operation of the liquid crystal display apparatus 100 will be described with reference to FIGS. 2A to 2D. When a voltage is not applied to the liquid crystal region 40a, the liquid crystal molecules 42 are aligned in a vertical direction to the substrate surface by an alignment regulating force of the vertical alignment films (not shown) formed on the substrates 100a and 100b on the liquid crystal layer side, as shown in FIG. 2A. When this state is observed with a polarizing microscope in crossed-Nicols, a dark field 15 is obtained (normally black state), as shown in FIG. 2B. When a voltage for a gray-scale display is applied to the liquid crystal region 40a, the liquid crystal molecules 42 having negative dielectric anisotropy are provided with a force aligning the major axes of the liquid crystal molecules 42 in a vertical direction to the electric field. Therefore, the liquid crystal molecules 40 tilt from the direction vertical to the substrate surface, as shown in FIG. 2C. At this time, the liquid crystal molecules 42 in the liquid crystal region 40a are axially symmetrically aligned with respect to an axis represented by a broken line in FIG. 2C by the polymer wall 18. When this state is observed with a polarizing microscope in crossed-Nicols, an extinction pattern is obtained in a direction of polarization axes, as shown in FIG. 2D.

In the present specification, the axially symmetrical alignment includes tangential alignment, radial alignment, and the like. The axially symmetrical alignment further includes spiral alignment, for example, as shown in FIG. 3A and 3B. The spiral alignment is obtained by adding a chiral agent to a liquid crystal material to provide a twist alignment force to the liquid crystal material. In an upper portion 40T and a lower portion 40B of the liquid crystal region 40, liquid crystal molecules are spirally aligned as shown in 3B, and in a central portion 40M, the liquid crystal molecules are tangentially aligned. Thus, the liquid crystal molecules are twisted in a thickness direction of the liquid crystal layer 40. In general, the direction of a central axis in axially symmetrical alignment is substantially identical with a normal direction of the substrate.

Viewing angle characteristics can be improved by axially symmetrically aligning liquid crystal molecules. When liquid crystal molecules are axially symmetrically aligned, anisotropy of the refractive index of the liquid crystal molecules is averaged in every azimuth direction. Therefore, there is no problem that viewing angle characteristics greatly vary depending upon an azimuth direction which is seen in a gray-scale display state of a conventional TN mode liquid crystal display apparatus. Furthermore, if a horizontal alignment film and a liquid crystal material having positive dielectric anisotropy are used, axially symmetrical alignment can be obtained even when a voltage is not applied. Wide viewing angle characteristics are obtained as long as liquid crystal molecules are axially symmetrically aligned at least under the application of a voltage.

According to the present invention, since the pixel electrodes 20 are formed on the polymer wall 18, the polymer wall 18 is not present between the pixel electrodes 20 and the counter electrode 32. Therefore, the voltage retention ratio can be prevented from decreasing. The polymer wall 18 partition the liquid crystal layer 40 into a plurality of liquid crystal regions 40a, and axially symmetrically align the liquid crystal molecules 42 in the liquid crystal regions 40a. The polymer wall 18 also cover nonuniform portions on the surface of the color filter layer 12 on the black matrix 14, and function as a protective film for protecting the boundary portions between the coloring resin layers 12a and 12b and between the coloring resin layers 12b and 12c. Thus, an OC layer, which is conventionally provided for flattening the nonuniform portions on the surface of the color filter layer and protecting the color filter layer and the black matrix, can be omitted.

The polymer wall 18 for axially symmetrically aligning the liquid crystal molecules 42 according to the present invention is preferably made of a transparent material. When the transparent polymer wall 18 is used, the liquid crystal layer 40 positioned on the polymer wall 18 can contribute to display. Thus, compared with the case where the polymer wall 18 is not made of a transparent material, display brightness can be substantially enhanced.

Furthermore, by using the polymer wall 18 having side faces inclined with respect to the substrate surface, alignment of the liquid crystal molecules 42 present in the vicinity of the polymer wall 18 at the periphery of the liquid crystal regions 40a becomes unlikely to be disturbed. This will eliminate light leakage at the periphery of the liquid crystal regions 40a, and the contrast in black display and the display quality can be enhanced. By setting an inclined angle θ of the side faces of the polymer wall 18 at about 50° or less, disconnection of the ITO film formed on the polymer wall 18 can be prevented in the course of production. In particular, by setting the inclined angle θ of the side faces of the polymer wall 18 at about 45° or less and about 3° or more, stable axially symmetrical alignment is realized, and a height h of the polymer wall 18 can be decreased. When the inclined angle θ of the side faces of the polymer wall 18 is smaller than about 3°, a satisfactory wall surface effect of stably controlling axially symmetrical alignment may not be obtained. When the inclined angle θ of the side faces of the polymer wall 18 is larger than about 45°, alignment of the liquid crystal molecules 42 present in the vicinity of the polymer wall 18 is disturbed, which may cause light leakage to decrease the contrast.

Furthermore, in the case where the height h of the polymer wall 18 is decreased, when the polymer wall 18 is made of transparent resin, the attenuation amount of light which passes through the polymer wall 18 can be suppressed. As a result, transmittance is improved, whereby further bright display can be obtained.

The column-shaped projections 22 for prescribing a cell gap do not contribute to the display. Therefore, by forming the column-shaped projections 22 on regions where the black matrix 14 is formed, a decrease in brightness caused by the column-shaped projections 22 can be prevented.

Figure 4A:
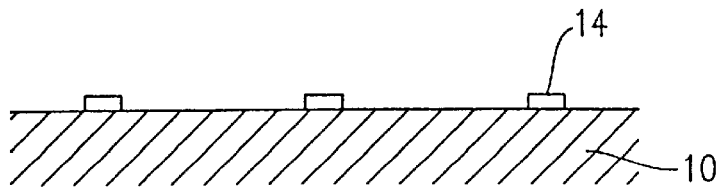
FIGS. 4A to 4G illustrate a method for producing the liquid crystal display apparatus in Embodiment 1.
Figure 4B:
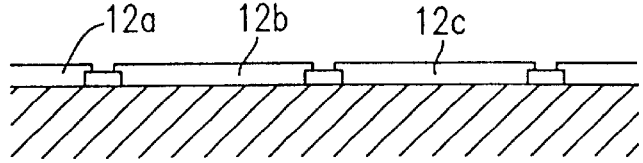
Figure 4C:
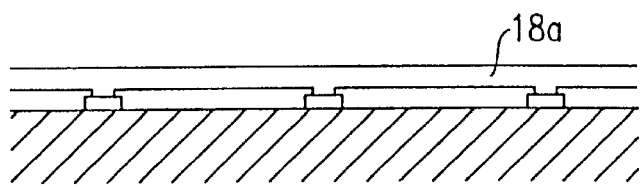

Hereinafter, a method for producing the liquid crystal display apparatus 100 of the present invention will be described with reference to FIGS. 4A to 4G. The black matrix 14 is formed on the glass substrate 10 so as to block light in gaps between the respective coloring patterns of R, G, and B (FIG. 4A). The black matrix 14 is made of a material in which fine particles of carbon are dispersed in photosensitive resin. Thereafter, the coloring resin layers 12a, 12b, and 12c of R, G, and B are successively formed (FIG. 4B). The thickness of the blackmask 14 and that of the coloring resin layers 12a, 12b, and 12c are prescribed to be about 1.0 μm. The coloring resin layers 12a, 12b, and 12c are obtained by spin-coating a material onto the glass substrate 10, and patterning the material by photolithography.

Figure 4D:
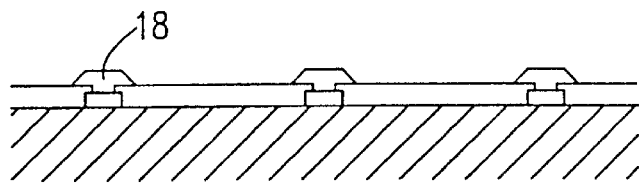

Thereafter, photosensitive acrylic resin is coated to a thickness of about 0.5 μm onto the glass substrate 10 by spin-coating, and the resin is patterned by photolithography using a predetermined mask, whereby the polymer wall 18 is formed (FIG. 4D). The polymer wall 18 covers nonuniform portions on the surface of the color filter layer 12 on the black matrix 14, and protect the boundary portions between the coloring resin layers 12a and 12b and between the coloring resin layers 12b and 12c. Herein, each pixel region has a size of about 150 μm×about 150 μm. Furthermore, the polymer wall 18 is formed in such a manner that the inclined angle of each side face of the polymer wall 18 falls in a range of about 3° to about 45° by adjusting the distance (proxy gap) between the mask at the time of proximity light exposure and the substrate surface and by optimizing the prebaking temperature after the material is coated.

After the polymer wall 18 is formed, an ITO film is formed to a thickness of about 300 nm by sputtering. At this time, the nonuniform portions of the color filter layer 12 is made smooth, so that disconnection of the ITO film does not occur.

Figure 4E:
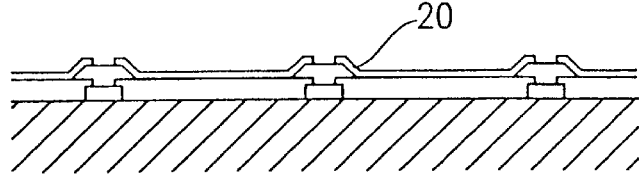

The ITO film is patterned by photolithography, and wet-etched with a hydrochloric acid type etchant, whereby the pixel electrodes 20 are formed (FIG. 4E). In regions where the ITO film is removed by etching (i.e., regions where the underlying layer of the ITO film is exposed to the etchant), the polymer wall 18 is formed, so that the underlying color filter layer 12 (the coloring resin layers 12a, 12b, and 12c, and the black matrix 14) are not corroded by the etchant. More specifically, the polymer wall 18 is confirmed to function as a conventional OC layer.

Figure 4F:
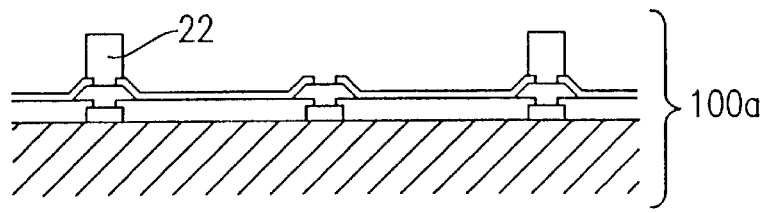

After the pixel electrodes 20 are formed, column-shaped projections 22 made of photosensitive acrylic resin, which prescribe a cell gap, are discretely formed on the polymer wall 18 by photolithography (FIG. 4F). The column-shaped projections 22 are formed on the polymer wall 18 and the black matrix 14. The height of the column-shaped projections 22 is prescribed to be about 5.5 μm so that the cell gap becomes about 6.0 μm (i.e., height of the polymer wall 18 (about 0.5 μm)+height of the column-shaped projections 22 (about 5.5 μm)=about 6.0 μm). An alignment material JALS-204 (produced by Japan Synthetic Rubber Co., Ltd.) is spin-coated onto the entire surface of the resultant substrate to form a vertical alignment film (not shown), whereby the color filter substrate 10a is obtained.

Figure 4G:
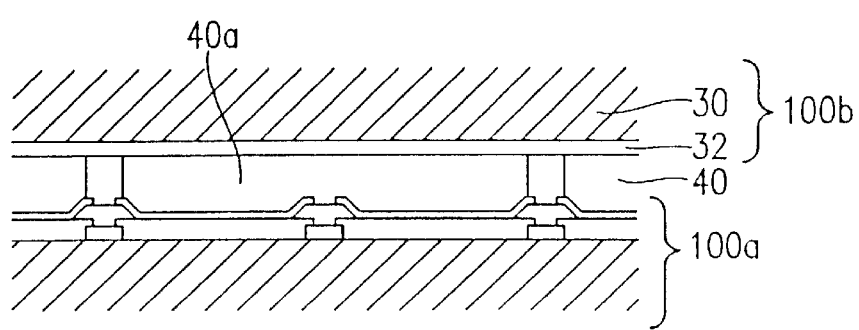

The counter substrate 100b, in which the counter electrode 32 made of an ITO film is formed on the glass substrate 30, and a vertical alignment film (not shown) is formed on the surface thereof, is attached to the color filter substrate 10a. A liquid crystal material with negative dielectric anisotropy (n-type liquid crystal with a chiral agent added thereto so as to obtain Δε=about −4.0, Δn about 0.08, cell gap= about 6.0 μm, and a twist angle=about 90°) is injected into a gap between the substrates 100a and 100b to form the liquid crystal layer 40, whereby a liquid crystal cell is obtained (FIG. 4G).

In order to stabilize central axes of axially symmetrical aligned liquid crystal molecules in the liquid crystal cell thus obtained, the liquid crystal layer 40 is supplied with a voltage of about 4 volts. In an initial state immediately after the application of a voltage, a plurality of central axes are formed. However, when the voltage continues to be supplied, one central axis is formed in each liquid crystal region 40a, whereby one axially symmetrical alignment region (monodomain) is formed.

Figure 5:
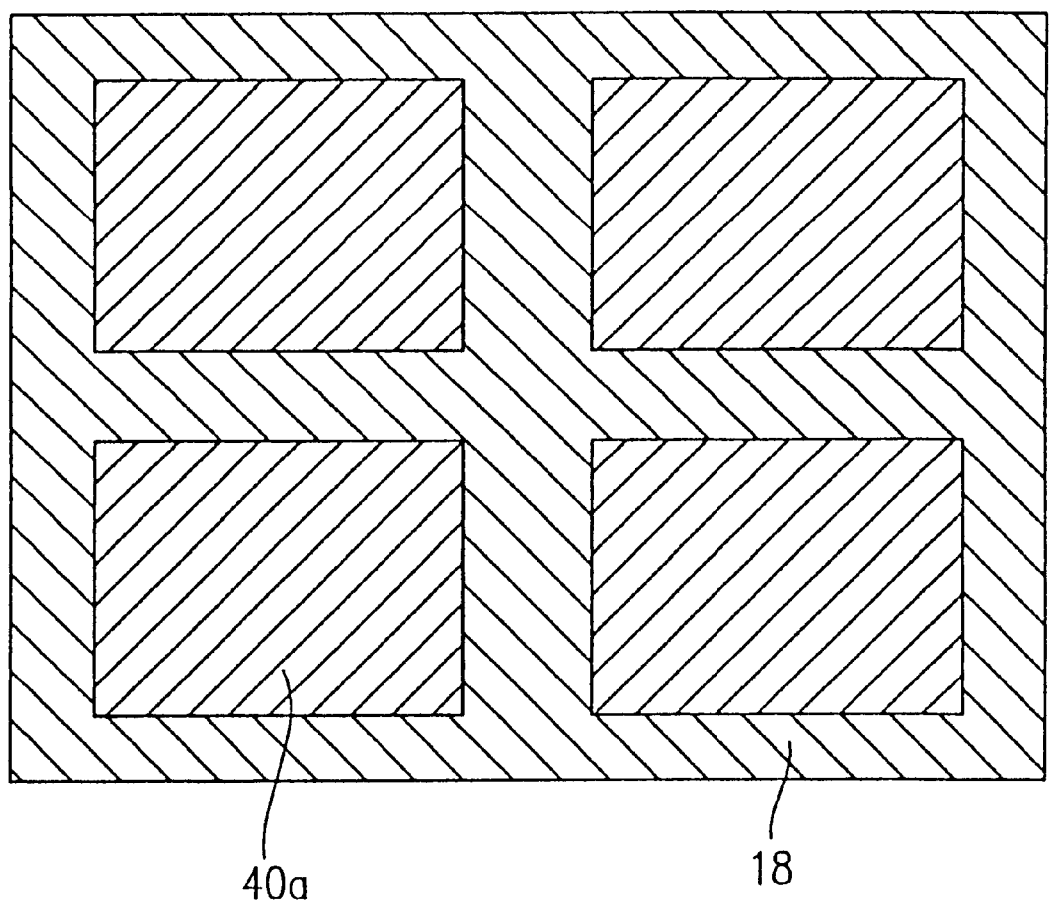
FIG. 5 is a schematic view showing the results obtained by observing a liquid crystal cell in Embodiment 1 with a polarizing microscope (crossed-Nicols).

FIG. 5 schematically shows the results obtained by observing the liquid crystal regions 40a in a transmission mode with a polarizing microscope (in crossed-Nicols) when no voltage is applied. When no voltage is applied, the liquid crystal region 40a exhibits a dark field (normally black mode). FIG. 5 shows the polymer wall 18 and the liquid crystal regions 40a using different patterns so as to clearly show the boundaries between the polymer wall 18 and the liquid crystal regions 40a. However, when the polymer wall 18 and the liquid crystal regions 40a are actually observed with a polarizing microscope, the boundaries therebetween cannot be observed. In a black display state as shown in FIG. 5, light leakage is not observed in the entire liquid crystal cell, and display with a high contrast ratio is obtained. Furthermore, a display defect is not caused by disconnection of the ITO film which is to be the pixel electrodes 20.

Figure 6:
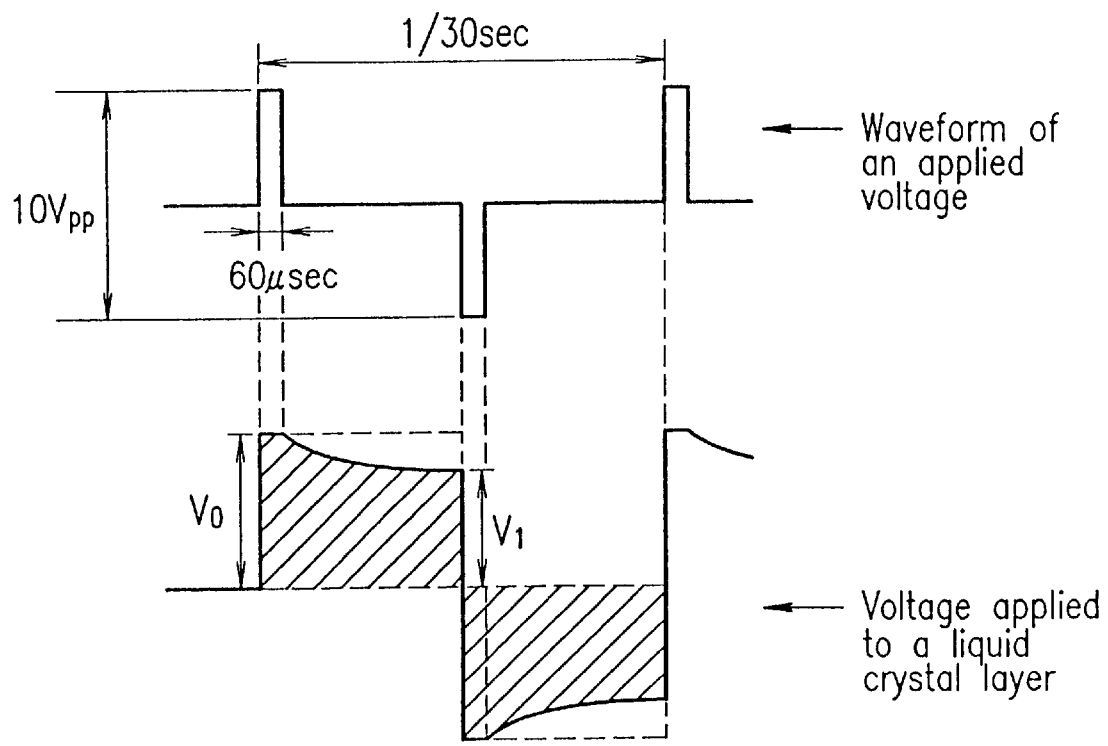
FIG. 6 is a view showing measurement conditions of voltage retention characteristics of a liquid crystal display apparatus.
Figure 11:
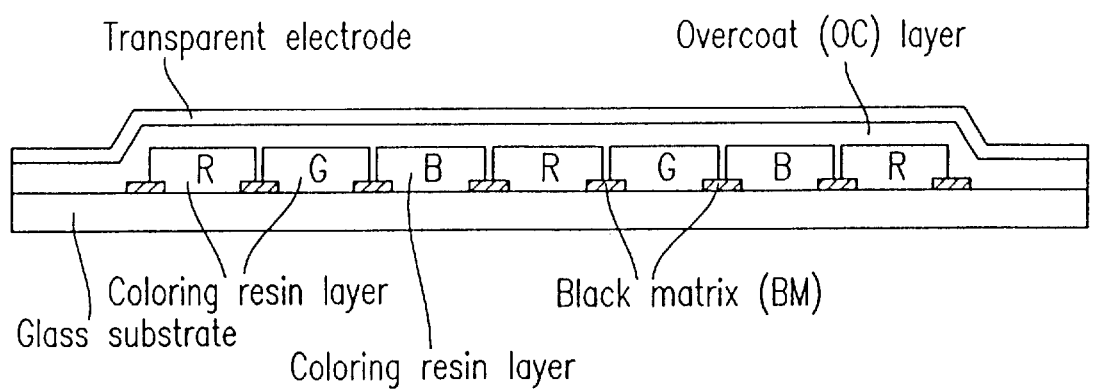
FIG. 11 is a cross-sectional view of a conventional color filter.

Furthermore, the retention ratio of a voltage applied to the liquid crystal layer 40 is measured to be about 99% at about 70° C. Even when a conducting aging test is performed for about 1,000 hours, the voltage retention ratio is maintained at about 98%, and image sticking is not observed during display. Thus, the liquid crystal display apparatus in the present embodiment exhibits satisfactory reliability. FIG. 6 shows measurement conditions of voltage retention ratio characteristics in the liquid crystal display apparatus. The voltage retention ratio is obtained by measuring a change in voltage in the liquid crystal layer (i.e., between electrodes) when the liquid crystal display apparatus is driven at a voltage Vpp of 10 volts, a frequency of about 30 Hz, and a pulse width of about 60 μsec.

COMPARATIVE EXAMPLE 1

The structure of a liquid crystal display apparatus in Comparative Example 1 obtained by the conventional production method shown in FIG. 10 will be described with reference to FIG. 6. The components which function substantially in the same way as those in Embodiment 1 are denoted by the same reference numerals as those therein, and the detailed description thereof will be omitted.

The liquid crystal display apparatus in Comparative Example 1 has a color filter substrate 200a shown in FIGS. 7A and 7B, in place of the color filter substrate 100a of the liquid crystal display apparatus 100 in Embodiment 1. The color filter substrate 200a has a structure in which a black matrix 14 and a color filter layer 12 including coloring resin layers 12a, 12b, and 12c corresponding to R, G, and B are formed on the glass substrate 10. An OC layer 16 is formed so as to cover substantially the entire surface of the color filter 12. The OC layer 16 covers nonuniform portions of the color filter layer 12 on the black matrix 14, and protect the surface of the color filter 12.

Pixel electrodes 20' made of an ITO film are formed on the OC layer 16, and a polymer wall 18' is formed so as to cover end portions of the pixel electrodes 20'. The side faces of the polymer wall 18' are substantially vertical to the substrate surface. The polymer wall 18' are made of black resin. The height of the polymer wall 18' is about 3 μm (about a half of the cell gap).

Furthermore, column-shaped projections 22' (height: about 3.0 μm) for prescribing the cell gap are formed on the polymer wall 18'. Finally, a vertical alignment agent is coated onto the resultant substrate. The color filter substrate 200a is attached to a counter substrate, and a liquid crystal material is injected into the gap therebetween, whereby a liquid crystal cell in Comparative Example 1 is completed.

The liquid crystal cell in Comparative Example 1 has the polymer wall 18' between the pixel electrodes 20' and the counter electrode. Therefore, the voltage retention ratio is low (i.e., about 95% at about 70° C). In a conducting aging test for about 1,000 hours, the voltage retention ratio decreases to about 94%. Furthermore, image sticking is conspicuous. Furthermore, light leakage is observed in a black display state, which is caused by disturbed alignment of liquid crystal molecules in the vicinity of the polymer wall 18'.

Embodiment 2

FIG. 8A schematically shows the cross-section of the liquid crystal display apparatus 300 in Embodiment 2. In the present embodiment, the structure using a liquid crystal material having negative dielectric anisotropy and a vertical alignment film is illustrated. The present embodiment is not limited thereto.

The liquid crystal display apparatus 300 has a color filter substrate 300a, a counter substrate 300b, and a liquid crystal layer 340 interposed therebetween. The color filter substrate 300a has the following structure. A black matrix 314 and a color filter layer 312 including coloring resin layers 312a, 312b, and 312c corresponding to R, G, and B are formed on a transparent substrate 310 such as a glass substrate.

A polymer wall 318 having side faces inclined with respect to the substrate surface is formed on the color filter 312. In the same way as in Embodiment 1, the polymer wall 318 partitions the liquid crystal layer 340 into a plurality of liquid crystal regions 340a and axially symmetrically align liquid crystal molecules (not shown). The polymer wall 318 also covers nonuniform portions of the color filter layer 312 on the black matrix 314, and protect boundary portions between the coloring resin layers 312a and 312b and between the coloring resin layers 312b and 312c in the subsequent step.

In the liquid crystal display apparatus 300 of the present embodiment, a silicon dioxide layer (hereinafter, referred to as a $SiO_2$ layer) 320 is formed so as to cover the polymer wall 318. The $SiO_2$ layer 320 is formed by a thin film deposition technique such as sputtering and vapor deposition. A transparent conductive film such as an ITO film is formed on the $SiO_2$ layer 320, and patterned to a predetermined shape by etching, whereby transparent electrodes 322 are formed. In the step of etching the transparent conductive film to form the transparent electrodes 322, the $SiO_2$ layer 320 which is an underlying layer of the transparent electrodes 322 is not etched.

Thereafter, column-shaped projections 326 made of photosensitive acrylic resin are formed on the $SiO_2$ layer 320 on the polymer wall 318. The surface of the resultant substrate (at least the surface of the transparent electrodes 322) is subjected to alignment treatment (e.g., provided with an alignment film), whereby the color filter substrate 300a is obtained. The color filter substrate 300a is attached to the counter substrate 300b in which a transparent electrode 332 is formed on the surface of the glass substrate 330, and a liquid crystal material is injected into the gap therebetween, whereby the liquid crystal display apparatus 300 is obtained.

A method for producing the liquid crystal display apparatus 300 in the present embodiment will be described below. The detailed description of the process which can adopt the same material and steps as those in Embodiment 1 will be omitted.

In the present embodiment, the $SiO_2$ layer 320 is formed to a thickness of about 20 nm by sputtering between the steps shown in FIGS. 4D and 4E. Thereafter, a transparent conductive film made of ITO is formed to a thickness of about 300 nm by sputtering. The transparent conductive film is patterned by selective etching, using an etchant containing hydrochloric acid and nitric acid in a volume ratio of 3:1, while leaving the $SiO_2$ film. The steps before and after the above-mentioned steps are conducted by using the same material and method as those in the liquid crystal display apparatus 100 in Embodiment 1.

The liquid crystal display apparatus 300 does not have the polymer wall 318 between the opposing transparent electrodes 320 and 332, in the same way as in the liquid crystal display apparatus 100 in Embodiment 1. Therefore, in Embodiment 2, a highly reliable liquid crystal display apparatus is provided, in which a voltage retention ratio is not decreased, and no image sticking is formed. Furthermore, the column-shaped projections 326 are formed on the SiO₂ film 320 which has outstanding adhesion with the polymer wall 318 and the polymer material of the column-shaped projections 326. Therefore, the SiO₂ film 320 and the column-shaped projections 326 are prevented from peeling off from the polymer wall 318, whereby a decrease in a production yield is minimized. Furthermore, the polymer wall 318 is covered with the SiO₂ film 320 so that the polymer wall 318 does not directly come into contact with the liquid crystal material. Therefore, impurities in the polymer wall 318 can be prevented from being eluted into the liquid crystal material. Since SiO₂ is chemically stable, it allows a high-purity film with a low content of ionic impurities to be industrially formed. Furthermore, SiO₂ has high adhesion with the ITO film, so that the SiO₂ film and the ITO film can be continuously formed in the identical sputtering apparatus only by replacing a target. Therefore, the surface of the SiO₂ film is unlikely to be contaminated before the ITO film is deposited thereon.

The liquid crystal display apparatus in the present embodiment has a high voltage retention ratio. Even when a conducting aging test is conducted, the voltage retention ratio is not decreased, and image sticking is not observed during display. Thus, the liquid crystal display apparatus exhibits satisfactory reliability. The reliability of the liquid crystal display apparatus in Embodiment 2 is more outstanding than that of the liquid crystal display apparatus in Embodiment 1.

Furthermore, the production yield of the liquid crystal display apparatus in the present embodiment is improved, compared with the liquid crystal display apparatus in Embodiment 1. With the liquid crystal display apparatus in Embodiment 1, if the process conditions (coating condition, prebaking condition, light-exposure condition, and development condition) for forming the column-shaped projections are out of an appropriate range, the column-shaped projections may peel off from the polymer wall. Furthermore, in the step of forming the ITO film by sputtering, the surface of the underlying polymer wall is damaged; as a result, the adhesion between the polymer wall and the column-shaped projections may decrease. In Embodiment 2, the column-shaped projections are formed on the polymer wall via SiO₂ having high adhesion with respect to the polymer material, so that the surface of the SiO₂ film is unlikely to be damaged in the step of forming the ITO film, and high adhesion can be maintained. Thus, in Embodiment 2, the process margin and the production yield are enhanced, making it possible to further decrease the cost of the liquid crystal display apparatus, compared with Embodiment 1.

Embodiment 3

In Embodiment 3, the long-period reliability of the liquid crystal display apparatus in Embodiment 2 is further improved. In Embodiment 2, although the surface of the polymer wall is covered with the SiO₂ film, the surface of the column-shaped projections directly come into contact with the liquid crystal material. The column-shaped projections are made of, typically the same polymer material as that of the polymer wall. Therefore, ionic impurities may be eluted from the polymer material of the column-shaped projections into the liquid crystal material to degrade long-period reliability. In the present embodiment, the column-shaped projections as well as the polymer wall are covered with an inorganic protective layer, whereby long-period reliability is improved. Furthermore, in order to prevent the adhesion between the column-shaped projections and the polymer wall from decreasing by damage to the surface of the polymer wall in the step of forming the ITO film and the inorganic protective layer by sputtering, the inorganic protective layer and the ITO film are formed after the column-shaped projections are formed on the polymer wall. In the present embodiment, the SiO₂ film and a silicon nitride layer (hereinafter, referred to as a SiNx layer) are used. However, the SiNx layer may be omitted.

FIG. 9 schematically shows a cross-section of a liquid crystal display apparatus 400 in Embodiment 3. In Embodiment 3, the structure using a liquid crystal material having negative dielectric anisotropy and a vertical alignment film is illustrated; however, Embodiment 3 is not limited thereto.

The liquid crystal display apparatus 400 has a color filter substrate 400a, a counter substrate 300b, and a liquid crystal layer 340 interposed therebetween.

The color filter 400a has a structure in which a black matrix and a color filter layer 312 including coloring resin layers corresponding to R, G, and B are formed on a transparent substrate 310 such as a glass substrate.

A polymer wall 318 having side faces inclined with respect to the substrate surface is formed on the color filter layer 312. In the same way as in Embodiment 1, the polymer wall 318 partition the liquid crystal layer 340 into a plurality of liquid crystal regions 340a and axially symmetrically align liquid crystal molecules (not shown). Furthermore, the polymer wall 318 cover nonuniform portions of the color filter layer 312 on the black matrix, and protect boundary portions between the coloring resins during the subsequent step.

Column-shaped projections 326 made of photosensitive acrylic resin are directly formed on the polymer wall 318 by photolithography. An SiNx layer 320a is formed so as to cover the polymer wall 318 and the column-shaped projections 326. A SiO₂ layer 320b is formed on the SiNx layer 320a. The SiNx layer 320a and the SiO₂ layer 320b can be continuously formed as follows. Using a silicon (Si) target, the SiNx layer 320a is formed in a nitrogen atmosphere by sputtering. The atmosphere is changed to an oxygen atmosphere, and then, the SiO₂ layer 320b is continuously formed. In Embodiment 3, the thickness of the SiNx layer 320a is prescribed to be about 30 nm, and the thickness of the SiO₂ layer 320b is prescribed to be about 15 nm.

The target is changed, and a transparent conductive film made of ITO is formed on the SiO₂ layer 320b by sputtering. The transparent conductive film is patterned to a predetermined shape by etching to form transparent electrodes 322. In Embodiment 3, an ITO film having a thickness of about 150 nm is formed. In the step of etching the transparent conductive film to form the transparent electrodes 322, the SiO₂ layer 320b and the SiNx layer 320a which are underlying layers of the transparent electrodes 322 are not etched. In the step of patterning the transparent conductive film, a solution containing hydrochloric acid and nitric acid in a volume ratio of 3:1 is used as an etchant.

The surface of the resultant substrate (the surface of at least the transparent electrodes 322) is subjected to alignment treatment (is provided with an alignment film), whereby a color filter substrate 400a is obtained. The color filter substrate 400a is attached to a counter substrate 300b in which a transparent electrode 332 is formed on the surface of a glass substrate 330. A liquid crystal material is injected into the gap therebetween, whereby a liquid crystal display apparatus 400 is produced. The steps before and after the above-mentioned steps are conducted by using the same material and method as those in the liquid crystal display apparatus 100 in Embodiment 1.

In the same way as in the liquid crystal display apparatus 100 in Embodiment 1, the liquid crystal display apparatus 400 has no polymer wall 318 between the opposing transparent electrodes 320 and 332. Thus, in Embodiment 3, a highly reliable liquid crystal display apparatus is provided, in which a voltage retention ratio is not decreased, and no image sticking is formed. Furthermore, the column-shaped projections 326 are directly formed on the polymer wall 318, so that the column-shaped projections 326 are prevented from peeling off from the polymer wall 318, whereby a decrease in the production yield is minimized. Furthermore, the polymer wall 318 and the column-shaped projections 326 are covered with the SiNx layer 320a so that the polymer wall 318 and the column-shaped projections 326 do not directly come into contact with the liquid crystal material. Therefore, impurities in the polymer wall 318 and the column-shaped projections 326 can be prevented from being eluted into the liquid crystal material. Since $SiO_2$ and SiNx are chemically stable, they allow a high-purity film with a low content of ionic impurities to be industrially formed. Furthermore, $SiO_2$ and SiNx have high adhesion with the ITO film, so that the $SiO_2$ film and the SiNx film can be continuously formed in the identical sputtering apparatus only by replacing an atmosphere gas and a target. Therefore, the surface of the respective films are unlikely to be contaminated before the subsequent film is deposited thereon.

In Embodiment 3, a silicon nitride layer, a silicon dioxide layer, and an ITO layer are used. The silicon nitride layer has higher resistance to an etchant (hydrochloric acid: mixture of nitric acid) of ITO than the silicon dioxide layer. Therefore, reliability of the silicon nitride layer as a protective film is further improved than in Embodiment 2. Furthermore, silicon nitride has high adhesion with respect to a polymer material; however, has relatively poor adhesion with respect to ITO. Therefore, the silicon dioxide layer is formed between the ITO layer and the silicon nitride layer, whereby the adhesion of these layers can be improved. The structure in Embodiment 3 is preferably applied to a liquid crystal display apparatus having a particularly fine pattern.

The liquid crystal display apparatus in Embodiment 3 exhibits a high voltage retention (initial value: 99% at about 70° C.). Even when a conducting aging test is performed for about 1,000 hours, the voltage retention ratio is not decreased, and image sticking is not observed during display. Thus, the liquid crystal display apparatus in the present embodiment exhibits more satisfactory reliability than that in Embodiment 2.

As described above, according to the present invention, a structure in which an OC layer is not present in an opening portion (central portion) of each pixel is realized. Therefore, compared with a conventional structure, a color liquid crystal display apparatus with improved transmittance and brightness is obtained, compared with a conventional structure. The polymer wall in the color liquid crystal display apparatus of the present invention partitions the liquid crystal layer into a plurality of liquid crystal regions, and axially symmetrically align liquid crystal molecules in the liquid crystal regions. Furthermore, the polymer wall covers nonuniform portions of the color filter layer on the black matrix, and protect boundary portions between the coloring resin layers. Thus, the OC layer can be omitted, which is conventionally provided for the purpose of flattening nonuniform portions on the surface of the color filter layer and protecting the color filter layer and the black matrix. Furthermore, the pixel electrodes are formed on the polymer wall, and the polymer wall is not present between the pixel electrodes and the counter electrode, so that a voltage retention ratio can be prevented from decreasing.

Furthermore, according to the production method of the present invention, the OC layer and the polymer wall can be simultaneously formed. Therefore, compared with a conventional method for producing a liquid crystal display apparatus using an ASM mode, the number of steps and the production cost are decreased, and the production yield is improved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A color liquid crystal display apparatus, comprising:
   a first substrate;
   a second substrate; and
   a liquid crystal layer interposed between the first and second substrates,
   wherein the first substrate includes a color filter having a plurality of coloring resin layers, a polymer wall covering a boundary portion between respective two adjacent coloring resin layers among the plurality of coloring resin layers, and transparent electrodes covering at least a part of the polymer wall,
   the liquid crystal layer has a plurality of liquid crystal regions partitioned by the polymer wall; and
   liquid crystal molecules in the plurality of liquid crystal regions are axially symmetrically aligned with respect to an axis perpendicular to a surface of the first substrate at least under an application of a voltage.

2. A color liquid crystal display apparatus according to claim 1, wherein the polymer wall has side faces inclined with respect to the surface of the first substrate.

3. A color liquid crystal display apparatus according to claim 2, wherein an angle of the side faces of the polymer wall inclined with respect to the surface of the first substrate is in a range of 3° to 45°.

4. A color liquid crystal display apparatus according to claim 1, wherein the polymer wall is made of photosensitive resin.

5. A color liquid crystal display apparatus according to claim 1, wherein the polymer wall is made of transparent resin.

6. A color liquid crystal display apparatus according to claim 1, further including column-shaped projections on at least a part of a surface of the polymer wall on the liquid crystal layer side,
   wherein a gap between the first and second substrates is formed by the polymer wall and the column-shaped projections.

7. A color liquid crystal display apparatus according to claim 1, wherein the first substrate has a silicon dioxide layer covering the polymer wall, and the transparent electrodes are formed on the silicon dioxide layer.

8. A color liquid crystal display apparatus according to claim 7, further including column-shaped projections on at least a part of a surface of the polymer wall on the liquid crystal layer side,
   wherein a gap between the first and second substrates is formed by the polymer wall and the column-shaped projections, and the column-shaped projections are formed on the silicon dioxide layer.

9. A color liquid crystal display apparatus according to claim 1, further including column-shaped projections on at least a part of a surface of the polymer wall on the liquid crystal layer side,
   wherein a gap between the first and second substrates is formed by the polymer wall and the column-shaped projections, and a silicon dioxide layer is formed on the polymer wall and a surface of the column-shaped projections on the liquid crystal layer side.

10. A color liquid crystal display apparatus according to claim 9, further including a silicon nitride layer between the surfaces of the polymer wall and the column-shaped projections on the liquid crystal layer side, and the silicon dioxide layer.

11. A method for producing a liquid crystal display apparatus including a first substrate, a second substrate, and a liquid crystal layer interposed between the first and second substrates, the liquid crystal layer including a plurality of liquid crystal regions partitioned by a polymer wall, comprising the steps of:

forming a color filter layer having a plurality of coloring resin layers on the first substrate;

forming a polymer layer made of photosensitive resin on the color filter layer;

patterning the polymer layer by photolithography, thereby forming the polymer wall covering boundary portions between respective two adjacent coloring resin layers among the plurality of coloring resin layers;

forming a transparent conductive layer on the first substrate on which the polymer wall is formed; and patterning the transparent conductive layer to form transparent electrodes covering at least a part of the polymer wall.

12. A method for producing a color liquid crystal display apparatus according to claim 11, further comprising the step of forming a silicon dioxide layer on the polymer wall, wherein the transparent conductive layer is formed on the first substrate on which the silicon dioxide layer is formed, and the transparent conductive layer formed on the silicon dioxide layer is selectively etched to form the transparent electrodes.

13. A method for producing a color liquid crystal display apparatus according to claim 12, further comprising the step of forming column-shaped projections on at least a part of a surface of the polymer wall on the liquid crystal layer side, wherein the column-shaped projections are formed on the silicon dioxide layer which is exposed by selective etching the transparent conductive layer.

14. A method for producing a color liquid crystal display apparatus according to claim 12, further comprising the steps of forming column-shaped projections on at least a part of a surface of the polymer wall on the liquid crystal layer side, and forming a silicon dioxide layer on the surfaces of the polymer wall and the column-shaped projections on the liquid crystal layer side.

15. A method for producing a color liquid crystal display apparatus according to claim 14, further comprising the step of forming a silicon nitride layer between the surfaces of the polymer wall and the column-shaped projections on the liquid crystal layer side, and the silicon dioxide layer.

* * * * *